(No Model.)

W. SEMKE.
BOILER FLUE CLEANER.

No. 606,093. Patented June 21, 1898.

WITNESSES:
M. D. Bloudel
Jos. A. Ryan

INVENTOR
W. Semke.
BY Munn & Co.
ATTORNEYS.

United States Patent Office.

WILLIAM SEMKE, OF HARRISON, KANSAS.

BOILER-FLUE CLEANER.

SPECIFICATION forming part of Letters Patent No. 606,093, dated June 21, 1898.

Application filed December 28, 1897. Serial No. 663,966. (No model.)

*To all whom it may concern:*

Be it known that I, WILLIAM SEMKE, a citizen of the United States, residing at Harrison, in the county of Jewell and State of Kansas, have invented certain new and useful Improvements in Boiler-Flue Cleaners, of which the following is a specification.

The object of the invention is to provide a flue-cleaner in which steam from the boiler may be discharged through a suitable head into the interior of the flues to loosen and remove all adhering foreign matter.

A further object is to connect the pipe carrying the head to the steam-supply pipe by a flexible tube, so as to provide for reciprocating the head in the flues.

A further object is to provide such an implement which shall be simple in construction and effective in its operation.

These objects I attain by the construction illustrated in the accompanying drawings, in which—

Figure 1:
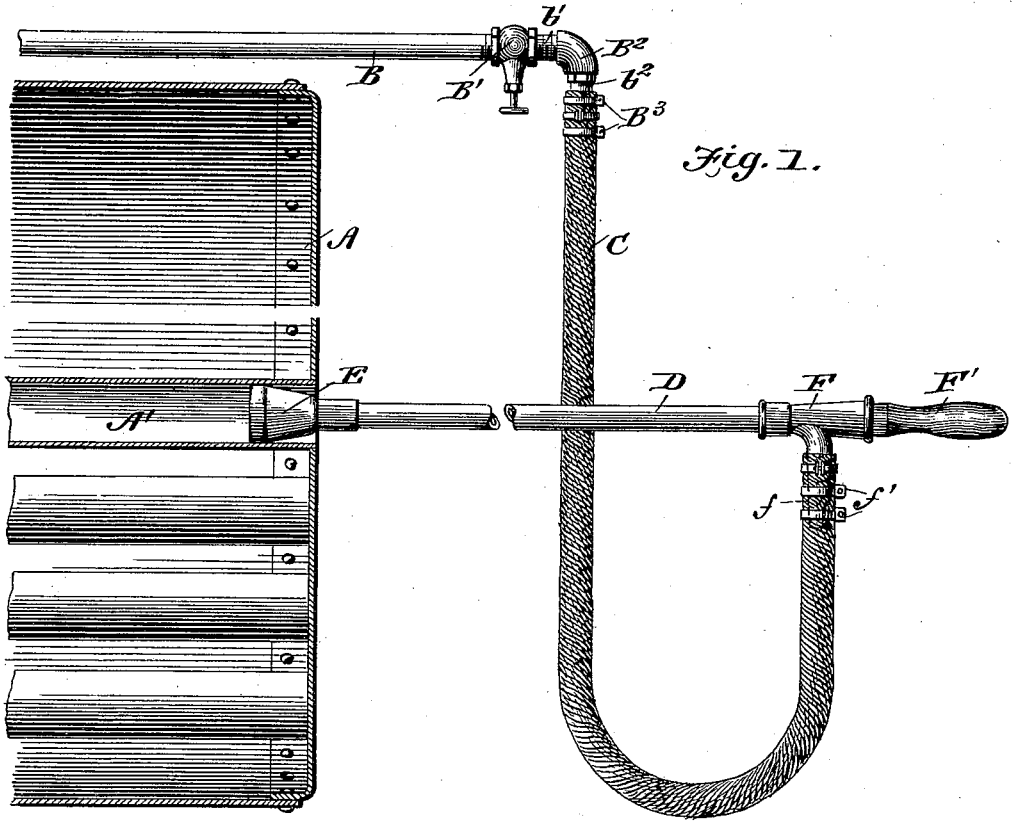
Figure 2:
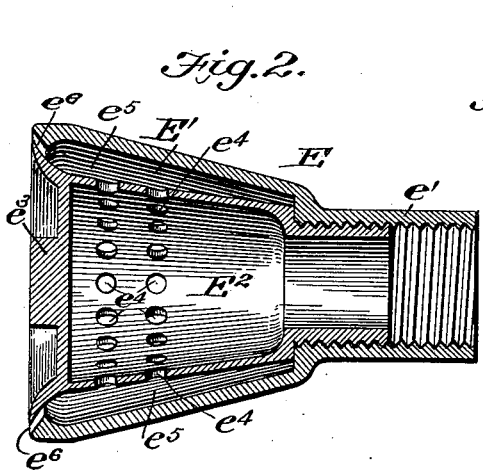
Figure 3:
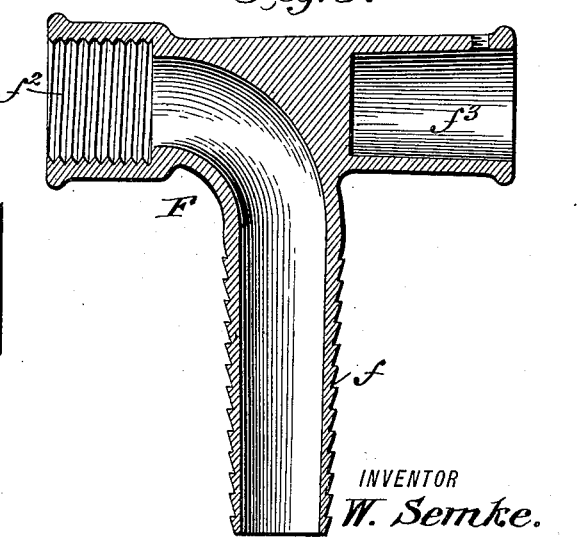

Figure 1 is a side elevation of my improved flue-cleaner, the head being shown within a boiler-flue. Fig. 2 is a central longitudinal section through the cleaner-head. Fig. 3 is a similar view of one of the couplings.

A represents a portion of a boiler, and A' one of its flues.

B is a pipe connected at one end to the boiler to supply the cleaner with steam, said pipe being provided with a globe-valve B', having a nipple $b'$, to which is connected the elbow-coupling $B^2$, having a swiveled nipple $b^2$, to which is connected, by clamps $B^3$, one end of a flexible pipe or steam-hose C. To the other end of this flexible pipe C is connected the operating-tube D, which carries at its forward end the cleaner-head E. The connection between the pipe C and the tube D is effected by an elbow connection F, having a hose-nipple $f$, to which the hose or flexible tube is clamped by the clamps $f'$, and also having a threaded socket $f^2$, into which is screwed the rear end of tube D. The elbow F is further provided opposite the socket $f^2$ with a handle-socket $f^3$ to receive the handle F', which is therefore in longitudinal alinement with the operating-tube D. This tube D will be made longer than the boiler-flues, so that the head can be worked through the flues from end to end, and, if desired, this tube D may be formed in sections, so that it can be adjusted for different lengths of flues.

The cleaner-head E is formed of an outer flaring or cone-shaped section E', having an elongated internally-threaded nipple at its smaller end, into the outer portion of which screws the end of tube D. This outer flaring section at its larger forward end is of a diameter to closely fit the boiler-flue and scrape soot, rust, &c., therefrom. E' is the inner head-section, closed at its larger forward end and having a tubular nipple screwing into the inner end of the nipple $e'$. The outer face of the closed end of head-section $E^2$ is provided with a wrench-receiving boss $e^3$, while the body of said section is formed with openings $e^4$, through which the steam may flow into the space $e^5$ between the inner and outer shells or sections E' $E^2$. In the front end of the head between the adjacent edges of the sections E' $E^2$ is formed an annular series of steam-outlet apertures $e^6$, which incline outwardly and forwardly, so as to direct jets of steam against the boiler-flue just in advance of the head. Thus the steam-jets will soften and loosen all matter adhering to the interior of the flues, and by reciprocating the head in the flue by means of the handle F' the loosened matter will be entirely removed, leaving the flues like new.

What I claim is—

In a boiler-tube cleaner, a head consisting of an outer section flaring toward and approximately to its front edge, which is beveled inwardly, and formed in the rear of its flaring portion with an internally-threaded nipple, and an inner section screwing into the said nipple, and closed at its outer end, said latter section flaring forwardly in a less degree than the outer section to a point near its front edge, at which point it is given a decided outward flare and closely approaches the beveled edge of the outer section, forming therewith a forwardly and outwardly extending steam-passage, and provided with annular series of openings through which the steam is adapted to flow into the space between the said shells, as and for the purpose set forth.

WILLIAM SEMKE.

Witnesses:
M. R. SUTHERLAND,
F. QUACKENBUSH.